United States Patent [19]

Shrinkle et al.

[11] Patent Number: 5,825,578
[45] Date of Patent: Oct. 20, 1998

[54] METHOD AND APPARATUS FOR COMPENSATING TRACK POSITION DUE TO WRITTEN-IN RUNOUT ERROR IN A DISC DRIVE

[75] Inventors: Louis J. Shrinkle, Leucadia, Calif.; Charles M. Sander, Niwot, Colo.

[73] Assignee: Seagate Technology, Inc., Scotts Valley, Calif.

[21] Appl. No.: 661,623

[22] Filed: Jun. 11, 1996

[51] Int. Cl.$^6$ .................................................. G11B 5/596
[52] U.S. Cl. ..................................... 360/77.08; 360/77.01
[58] Field of Search ........................... 360/77.08, 78.14, 360/77.01, 77.02, 77.05, 78.04, 135; 369/32, 44.28

[56] References Cited

U.S. PATENT DOCUMENTS

| 4,633,345 | 12/1986 | Keener | 360/77.08 |
| 5,400,201 | 3/1995 | Pederson | 360/77.08 |
| 5,523,902 | 6/1996 | Pederson | 360/77.08 |

FOREIGN PATENT DOCUMENTS

WO 91/06096   5/1991   WIPO .

*Primary Examiner*—Tan Dinh
*Attorney, Agent, or Firm*—Westman, Champlin & Kelly, P.A.

[57] ABSTRACT

A disc drive device where data and servo position information is stored in data segments on concentric tracks on the disc surface. The servo position information indicates the track centerline for each data segment. The offset of the servo position information from an ideal track centerline for each track is measured and stored into memory. The read/write head, which accesses data on the disc tracks, is positioned over the track centerline based on the offset for each data segment.

24 Claims, 5 Drawing Sheets

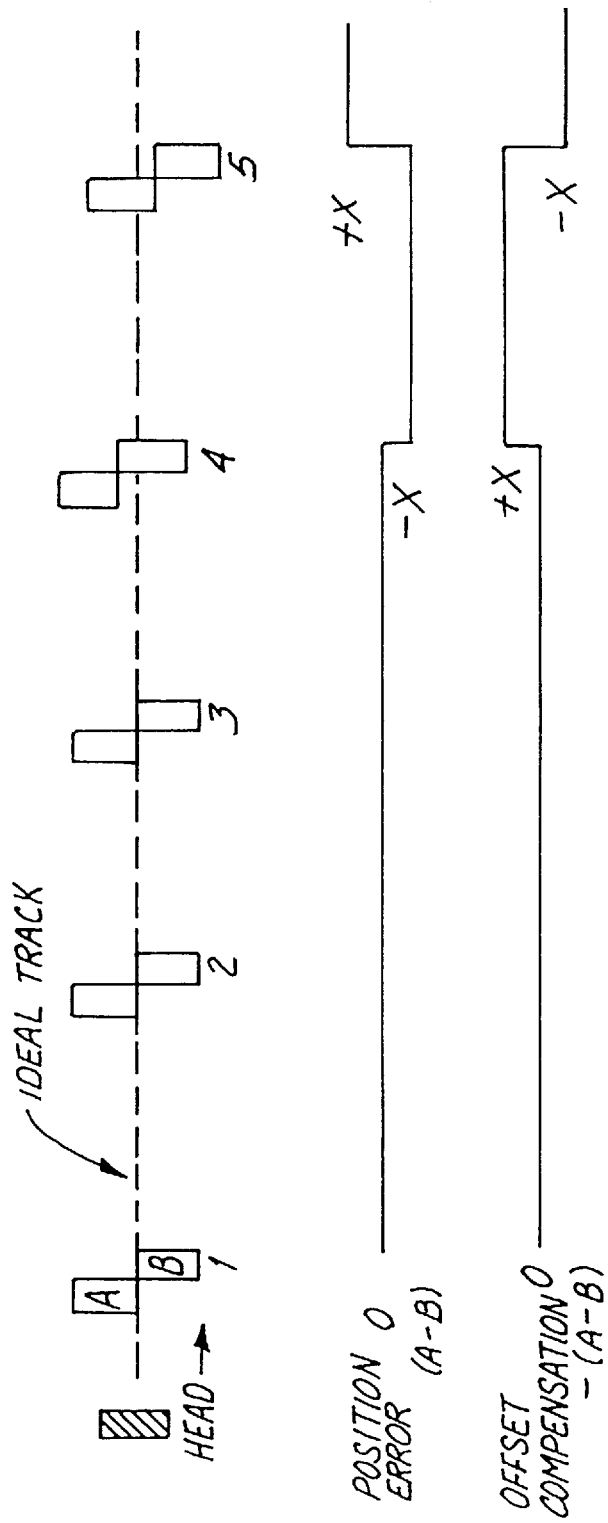

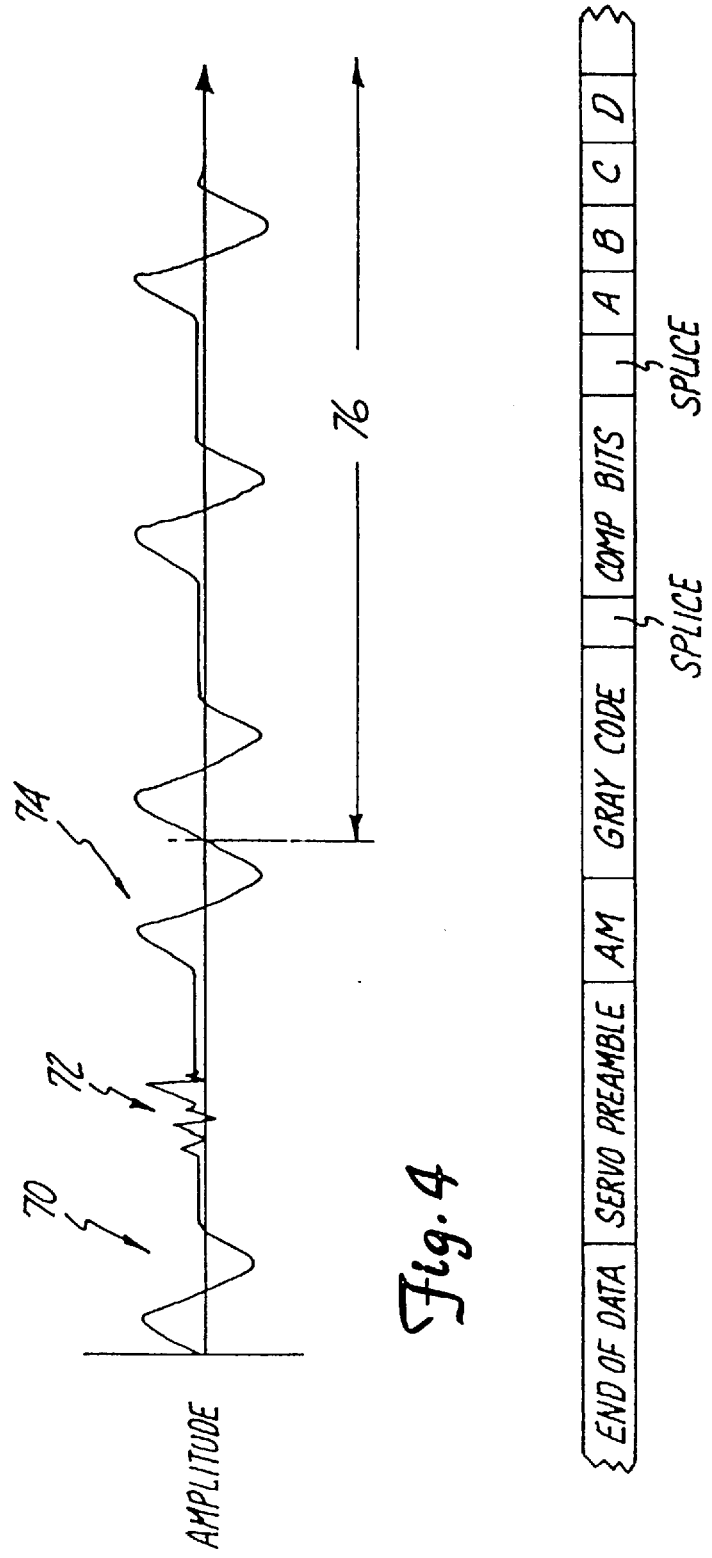

METHOD AND APPARATUS FOR COMPENSATING TRACK POSITION DUE TO WRITTEN-IN RUNOUT ERROR IN A DISC DRIVE

FIELD OF THE INVENTION

The present invention is directed to disc drives. More particularly, the present invention provides an apparatus and method for compensating track position due to written-in runout error in a disc drive.

BACKGROUND OF THE INVENTION

Disc drives are commonly used in work stations, personal computers, laptops and other computer systems to store large amounts of data in a form that can be made readily available to a user. In general, a disc drive comprises a magnetic disc that is rotated by a spindle motor. The surface of the disc is divided into a series of data tracks that extend circumferentially around the disc. Each data track is divided into a series of data sectors and store data in the form of magnetic transitions on the disc surface.

In a conventional disc drive design, each data sector of a data track is divided into a number of fields, including an address header field that contains magnetic transitions representing unique identification information for the specific data stored in the data sector. In this manner, the disc drive system can locate and verify the exact data sector for any particular block of data that a host computer may require, e.g., in a read operation. Among the information stored in an address header field is head identification information to uniquely identify the particular head of a head stack assembly that is transducing the magnetic transitions, track number, data sector identification and track defect information.

As track densities increase in embedded servo drives, certain errors remain fixed and do not scale with track density. The fixed errors become a limitation to the upper track density limit. One of the most significant errors is the written-in runout error. Written-in runout errors are the deviations of the position burst centers from the ideal concentric circular track. These errors are caused during the servo format, normally called the servo track write. The written-in runout errors are due to spindle runout during servo track write, vibrations or movements during servo track write, and media defects or media noise in the burst area.

These errors can and usually do occur at rates high enough that either the servo system in the drive cannot respond to them or responds in such a way so as to amplify the error. In the end, the actuator will make unnecessary movements that will marginalize the read/write performance and cause track encroachment. Furthermore, write protection circuitry is signalled by the errant position burst to block writing because the servo system believes it is offtrack.

SUMMARY OF THE INVENTION

This invention provides for compensation of all errant position error bursts such that if the actuator is holding to an ideal circular concentric track, all compensated position error burst outputs will be identical, indicating perfect tracking. This will cause less unwanted actuator movement and will also cause fewer unwanted false blocks of writes.

The disc drive device has at least one disc with many concentric tracks on the disc surface. Each track includes at least one data segment capable of storing data and servo position information. The servo position information indicates the track centerline for each data segment. To compensate track position error, the offset of each servo position information from an ideal track centerline for each track or data segment is measured and then stored into memory. The offset can also be represented as the distance between the track centerline and the ideal track centerline. Finally, a controller positions the read/write head relative to the ideal track centerline and the servo information based on the offset, such that the read/write head is positioned over the track centerline based on the offset. The tracks can be characterized by taking a multiple average of the path of each track using the read/write head while reducing track-following bandwidth of the read/write head, and accommodating the servo resonance to the offsets. Preferably, the characterization of the tracks is done during the final drive test in the formatting process. Alternatively, the actual error signal, which is a combination of the offsets and the servo response to the offsets, can be stored and used to modify the write offtrack threshold. In this case, averages are taken and the band width of the control loop is not reduced.

The memory, which contains the stored offsets, can be the disc surface or a random access memory (RAM). In the case where the offsets are stored on the disc surface and where one or more ID fields exist between servo positions, the offset can be written in the formatted ID field. Where a data segment is sufficiently long so that more than one quantity of servo position information is located in the data segment, multiple compensation offsets are written in the ID field for that data segment. Storing the compensation values in a RAM may be more economical when compensating only defective data segments is sufficient. The information may also be stored in the Gray Code of the headerless format.

The present invention is applicable to all data formats for disc drive devices such as the single ID field format currently in use (where each data segment or field has one ID field written on the disc), as well as the dual ID field format, and dual-merged ID field formats anticipated for use with magnetoresistive (MR) heads, and headerless sectors. By placing the compensation information in a memory, such as RAM, in the disc drive device, the compensation technique of the present invention can also be used with headerless data formats.

BRIEF DESCRIPTION OF THE DRAWINGS

FIG. 3 illustrates several servo positions on a track and the corresponding position errors and offset compensation.

FIG. 4 is a graph showing the output signal from the head versus time.

FIG. 5 is a diagram showing a record in accordance with one embodiment of the present invention.

DETAILED DESCRIPTION OF THE PREFERRED EMBODIMENTS

The present invention is for use in "embedded servo" type disc drives. Typically there are about 100 servo sectors on each track. The servo sector contains errors "bursts" such that, as the head moves off track, each servo sector will provide information to the servo processor related to how far off track the head has moved. If the head is on a perfect concentric circle and is not wandering off track, and if the servo bursts were placed perfectly on that concentric circle, then each burst output from each servo sector would provide the same off track signal, zero. However, servo bursts are typically not placed perfectly on a concentric circle, or media defects distort their position in a way that is repeatable. If the error in the burst is known (i.e. the error from the perfectly concentric track) then it is possible to add in a compensating value to the position error signal that would provide a zero output in the position error signal when the head is on track.

Figure 1:
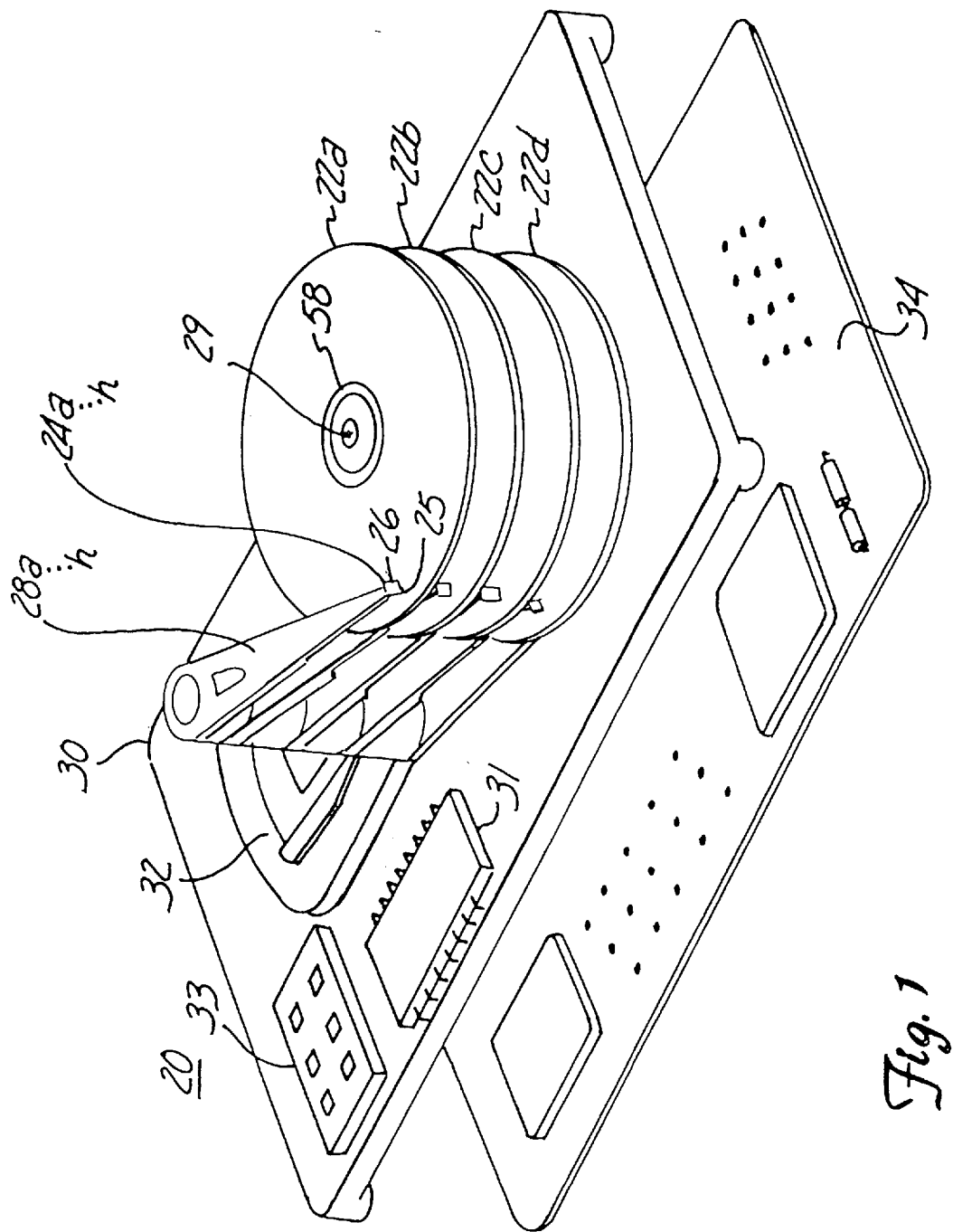
FIG. 1 is a perspective view of an exemplary disc drive.

Referring now to the drawings, and initially to FIG. 1, there is illustrated an example of a disc drive designated generally by the reference numeral 20. The disc drive 20 includes a stack of storage discs 22a–d and a stack of read/write heads 24a–h. Each of the storage discs 22a–d is provided with a plurality of data tracks to store user data. As illustrated in FIG. 1, one head is provided for each surface of each of the discs 22a–d such that data can be read from or written to the data tracks of all of the storage discs. It should be understood that the disc drive 20 is merely representative of a disc drive system utilizing the present invention and that the present invention can be implemented in a disc drive system including more or less storage discs.

The storage discs 22a–d are mounted for rotation by a spindle motor arrangement 29, as is known in the art. Moreover, the read/write heads 24a–h are supported by respective actuator arms 28a–h for controlled positioning over preselected radii of the storage discs 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disc surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. Alternatively, each of the read/write heads 24a–h can be an MR head as known in the art. As typically utilized in disc drive systems, the sliders 26 cause the magnetic transducers 25 of the read/write heads 24a–h to "fly" above the surfaces of the respective storage discs 22a–d for non-contact operation of the disc drive system, as discussed above. When not in use, the voice coil motor 32 rotates actuator arms 28a–h during a contact stop operation, to position the read/write heads 24a–h over a respective landing zone 58 or 60, where the read/write heads 24a–h come to rest on the storage disc surfaces. As should be understood, each of the read/write heads 24a–h is at rest on a respective landing zone 58 and 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h, to control the transfer of data to and from the data tracks of the storage discs 22a–d. The manner for coupling the PCB 34 to the various components of the disc drive is well known in the art.

Figure 2:
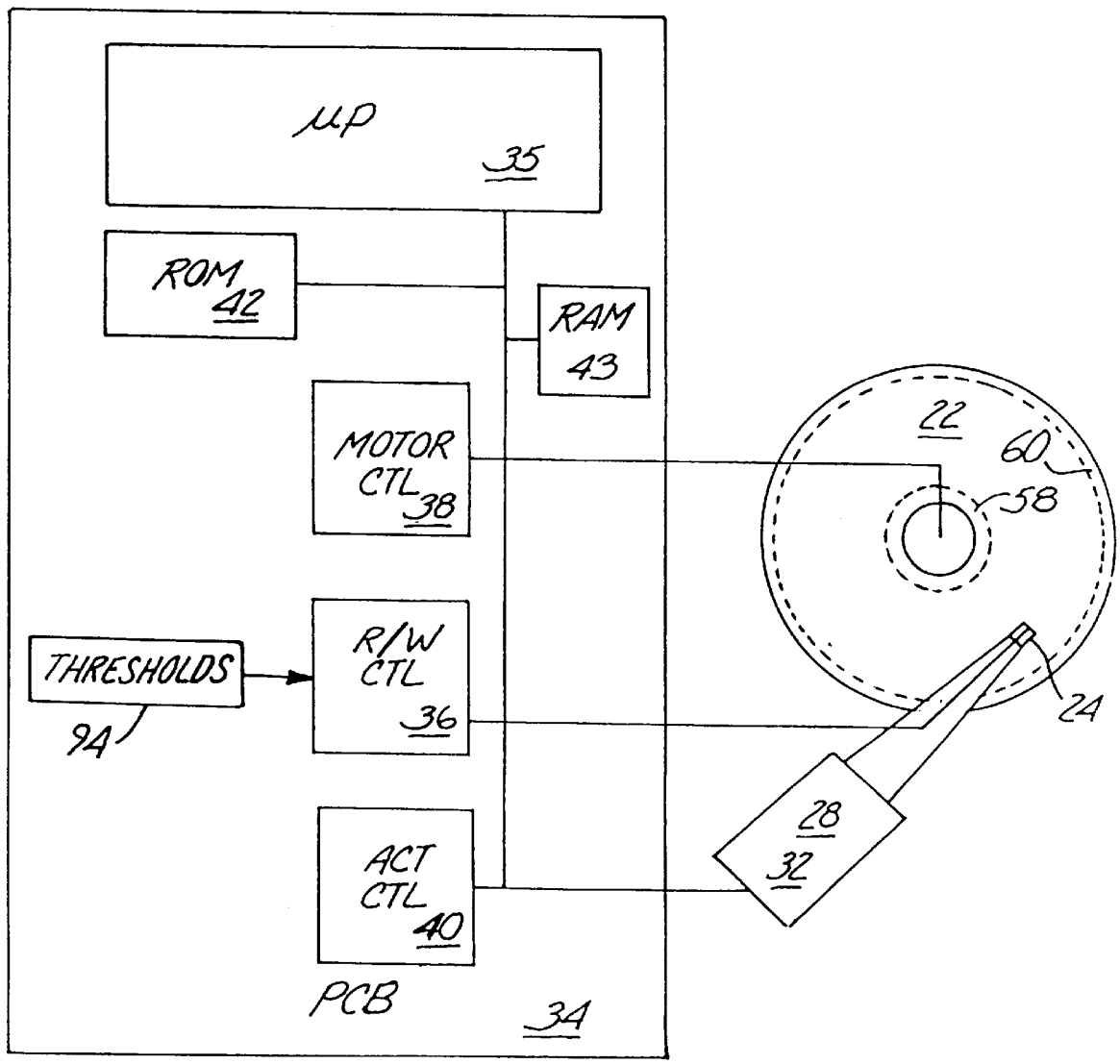
FIG. 2 is a top plan view of the printed circuit board of the disc drive of FIG. 1.

Referring now to FIG. 2 there is illustrated in schematic form the PCB 34 and the electrical couplings between the control electronics on the PCB 34 and the components of the disc drive system described above. A microprocessor 35 is coupled to each of a read/write control 36, spindle motor control 38, actuator control 40, read-only memory (ROM) 42 and RAM 43. In modern disc drive designs, the microprocessor can comprise a digital signal processor (DSP). The microprocessor 35 sends data to and receives data from the storage disc 22a–d via the read/write control 36 and the read/write heads 24a–h.

The microprocessor 35 also operates according to instructions stored in the ROM 42 to generate and transmit control signals to each of the spindle motor control 38 and the actuator control 40.

The spindle motor control 38 is responsive to the control signals received from the microprocessor 35 to generate and transmit a drive voltage to the spindle motor 29 to cause the storage discs 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage discs 22a–d. The magnitude and polarity of the voltage generated by the actuator control 40, as a function of the microprocessor control signals, determines the radial direction and speed of the read/write heads 24a–h.

When data to be written or read from one of the storage discs 22a–d are stored in a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h, over the specific data track to be written or read, to the read/write control 36, as is generally known in the art. The read/write control 36 includes a read channel that, in accordance with modern disc drive design, comprises an electronic circuit that detects information represented by magnetic transitions recorded on the disc surface within the radial extent of the selected data track. As described above, each data track is divided into a number of data sectors.

During a read operation, electrical signals transduced by the head from the magnetic transitions of the data sectors are input to the read channel from the read/write control 36 for processing. The RAM 43 can be used to buffer data read from or to be written to the data sectors of the storage discs 22a–d via the read/write control 36. The buffered data can be transferred to or from a host computer utilizing the disc drive for data storage.

FIG. 3 shows servo position burst information on a track. In this embodiment a track centerline is delineated by the line passing directly underneath an "A" burst and directly above a "B" burst. One skilled in the art will appreciate that other servo positioning systems can be used to delineate a track centerline. Servo information located at the servo bursts is used by the actuator control to position the read/write head over the appropriate track. Typically a track will contain 50–150 bursts in one revolution.

As seen in the upper portion of FIG. 3, an ideal track is shown as a dashed line. The ideal track is one that forms a perfect circle on the disc in the disc drive device. When the servo information is placed on the disc during a servo writing (or packwriting) operation, the servo bursts may be placed at locations outward or inward from the ideal track centerline. These deviations from the ideal track centerline can occur due to spindle runout, vibrations, or movements during the servo writing operation, as well as media defects or media noise in the servo burst area.

Referring to the middle portion of FIG. 3, the position error is shown as –X for servo burst 4 and as +X for servo burst 5. A compensation signal is shown in the bottom portion of FIG. 3. In this embodiment, the compensation signal is the inverse of the position error. The sum of the compensation signal and the error signal would provide for ideal tracking and fault-free position sense. In other words, the compensation signal represents a value related to the distance the head should be moved to compensate for the variation of the servo burst from the ideal track centerline. In this embodiment, a positive compensation value means that the head should be moved inward while a negative compensation value means that the head should be moved outward. By compensating the position of the head, the head will be more likely centered over the appropriate data segment.

To obtain the compensator values, the track must be characterized by: (1) reducing the track-following bandwidth so the head follows a truer concentric circle, (2) taking multiple averages to remove non-repeatable errors, and (3) compensating for the servo response to the offsets.

Once the track is characterized, the offsets can be stored for later retrieval. Preferably, the offsets would be written in the formatted ID field of the disc drive. In many disc drives, this can be accomplished because there is always one or more ID fields between servo sectors. Preferably, the characterization of the tracks is done during the final drive test in the formatting process. Storage could also be done in RAM initialized from the hard disc itself. Compensating only defective data segments may be sufficient in which case storing the compensation values in a RAM may be economical. If a data segment is sufficiently long such that more than one servo burst appears in the data segment, writing multiple compensation offsets in the ID field for that data segment may be necessary.

Some disc drives do not use a data ID field to provide more efficient use of the recording surface. Instead, such discs use a Gray Code to carry information. In one embodiment of the present invention, the compensation values are encoded into a Gray Code such as that shown in FIG. 4. FIG. 4 is a graph of signal output amplitude versus time. In FIG. 4, the last bit 70 of a Gray Code is shown followed by a splice 72 which precedes a sync di-bit 74. Sync di-bit 74 is used to synchronize receipt of the following code di-bits 76 which contain the compensation values. The sync di-bit 74 an compensation di-bits 76 can be encoded either as single bits or, preferably, as di-bits. If di-bits are used, the Gray Code detector is compatible with the code di-bits.

FIG. 5 is a representation of a portion of a record written in accordance with one embodiment of the invention. As shown in FIG. 5, following the end of data from one record, the servo preamble and Gray Code for the next record follows. The compensation data is inserted in between two splices in the record (72 in FIG. 4). The compensation data can be written on either the center line for the read gap or write gap in dual gap magnetic caps (such as magnetoresistive heads) or in between the read and write gap center lines. To increase off track read performance, the compensation data can be staggered on the disc so that on either side of a compensation field a DC erase is encountered. This embodiment is shown in Table 1:

| TRACK N – 1 | GRAY CODE | SP | COMP BITS | DC ERASE |
|---|---|---|---|---|
| TRACK N | GRAY CODE | SP | DC ERASE | COMP BITS |
| TRACK N + 1 | GRAY CODE | SP | COMP BITS | DC ERASE |
| TRACK N + 2 | GRAY CODE | SP | DC ERASE | COMP BITS |

Figure 6:
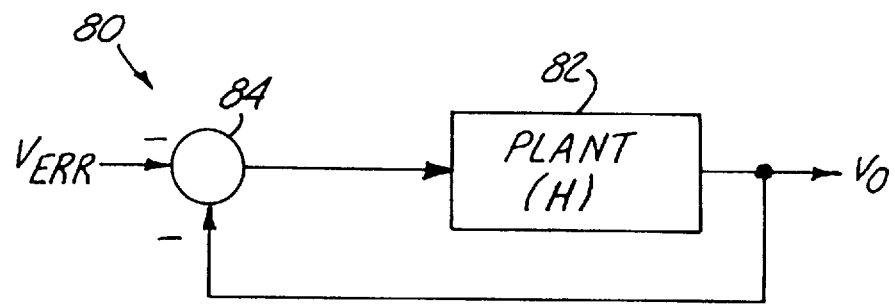
FIG. 6 is a block diagram of a servo system.
Figure 7:
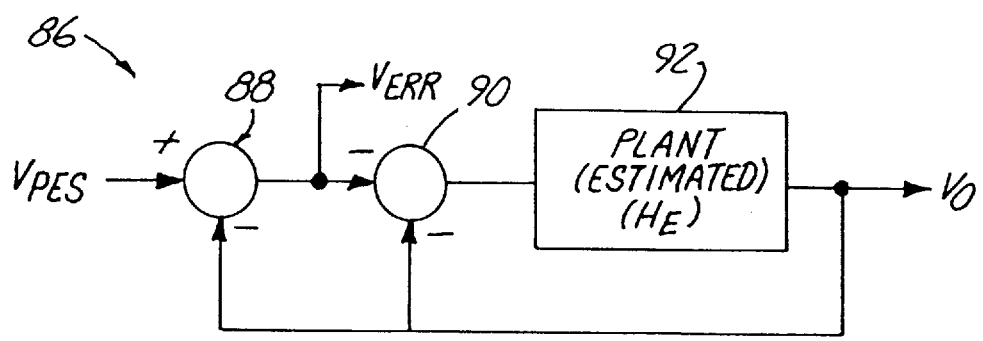
FIG. 7 is a block diagram of a servo system in accordance with one embodiment of the invention.

FIGS. 6 and 7 describe another embodiment for determining the fixed error for use with the present invention as previously described. FIG. 6 is a block diagram of a servo system 80 in which $V_{ERR}$, the fixed error due to burst placement, is provided as an input. $V_{ERR}$ is not directly observable. The plant response H is due to the actuator response plus the servo compensation and other responses in the feedback loop and is shown at block 82. The output from block 82 represents the response of the system to the error and is labeled $V_O$ and is fed back to summation node 84 for combination with the $V_{ERR}$ input. In the present invention, it is useful to be able to determine $V_{ERR}$ from the total error signal $V_{PES}$ which is observable. $V_{PES}$ is the combination of fixed error $V_{ERR}$ and the response $V_O$. Thus, $V_{PES}=V_{ERR}+V_O$, or, $V_{ERR}=V_{PES}-V_O$. It is possible to estimate $V_{ERR}$ using software to form the network 86 of FIG. 7. In FIG. 7, the total error input $V_{PES}$ is provided to summation node 88 whose output is provided to summation node 90. The output of summation node 90 is provided to an estimated plant $H_E$ 92. The plant estimator response $H_E$ is not exactly known, but can be estimated by using design targets for the actuator and compensation circuits. The output $V_O$ is provided to summation nodes 88 and 90. As shown in FIG. 7, the output of summation node 88 is $V_{ERR}$ which can be stored for use in accordance with the present invention.

One may also obtain the compensation values in accordance with another embodiment. In a previously described embodiment, the invention essentially modifies or compensates each servo burst so that a head 24 following a perfectly concentric track would have zero error signal. Instead of trying to force head 24 to follow such a track, in another embodiment, head 24 is allowed to follow the nominal, or average, written track. On a typical average revolution, head 24 detects a number of servo bursts that are somewhat off center which results in actuator movement and the position error signal ($V_{PES}$) is non zero. If this signal is averaged many times, the typical track position error signal would be known for that track. Instead of storing $V_{ERR}$, for each servo sector, $V_{PES}$ is averaged and stored, for example in memory 42 or 43. $V_{PES}$ can be directly measured. $V_{PES}$ average is used to modify the write-off track threshold 94. Specifically, the average $V_{PES}$ is added to the write-off track threshold prior to comparing the read signal with the threshold. Although the head does not follow the perfect track, which is the ideal situation, any false triggering of the write-off track thresholds due to poorly placed servo bursts is mitigated. In typical disc drives, this is one of the most significant problems with fixed burst placement errors which lead to track wander due to these errors. The $V_{PES}$ signal is encoded in the ID field or in the Gray Code/address mark field as described above.

The present invention finds its greatest use when the drive is in a track following mode of operation. Accordingly, the track following algorithm for the disc drive device may require continuous reading of ID fields (and compensation values) for optimal track following. In the so-called idle mode or seek mode, however, it may not be necessary to use the compensation values, since critical track following is not as necessary. By not using the compensation technique described above during an idle mode, significant power may be saved.

Although the present invention has been described with reference to preferred embodiments, workers skilled in the art will recognize that changes may be made in form and detail without departing from the spirit and scope of the invention.

What is claimed is:

1. In a disc drive device having at least one disc having a plurality of concentric tracks on a surface of the disc where each of the tracks includes at least one data segment adapted to store data and servo position information indicating a track centerline for each data segment, a method for compensating track position errors, comprising:

measuring an offset of the servo position information from an ideal track centerline for one of the tracks of the disc in the disc drive device;

storing the offset into a memory; and positioning a read/write head in the disc drive device relative to the ideal track centerline and the servo information in dependence on the stored offset, such that the read/write head is positioned over the track centerline in dependence on the offset.

2. The method of claim 1 wherein the memory is on the surface of the disc in the disc drive device.

3. The method of claim 1 wherein the memory is a random access memory.

4. The method of claim 1 wherein the offset represents distance between the track centerline and the ideal track centerline.

5. The method of claim 1, further comprising:

characterizing the tracks, by at least taking a multiple averages of the path of the track using a read/write head while reducing a track-following bandwidth of the read/write head and correcting for servo response to the error.

6. The method of claim 1 wherein controlling step includes controlling the read/write head over only defective data segments.

7. The method for compensating track position error according to claim 1, wherein the measuring step and storing step are performed entirely at a final drive test in a formatting process.

8. In a disc drive, an apparatus for compensating track position error, comprising:

at least one disc having a plurality of concentric tracks on a surface of the disc, where each of the tracks includes at least one data segment adapted to store data and servo position information indicating a track centerline for each of the data segments;

a read/write head coupled within the disc drive, where the read/write head writes the data to and reads the data from the concentric track on the surface of the disc;

a memory coupled within the disc drive and coupled to the read/write head, where the memory contains an offset of the servo position information from an ideal track centerline for one of the tracks of the disc in the disc drive device; and a controller coupled within the disc drive and coupled to the read/write head and the memory, where the controller positions the read/write head in the disc drive device over the track centerline in dependence on the offset.

9. The apparatus of claim 8 wherein the memory is the surface of the disc in the disc drive device.

10. The apparatus of claim 8 wherein the memory is a random access memory.

11. The apparatus of claim 8 wherein the offset represents distance between the track centerline and the ideal track centerline.

12. The apparatus of claim 8 wherein the offset is generated by taking a multiple averages of a path of the track using a read/write head while reducing a track-following bandwidth of the read/write head.

13. The apparatus of claim 8 wherein the controller positions the read/write head in the disc drive device over the track centerline in dependence on the offset for only defective data segments.

14. The apparatus of claim 9 wherein the data segment includes an ID field and wherein at least one of the ID fields is between consecutive areas of the servo position information, where the offsets stored in the ID field.

15. The apparatus of claim 9 wherein the data segment includes an ID field and wherein at least two the areas of servo position information are between consecutive the ID fields, such that a plurality of the offsets are stored in the ID field.

16. The apparatus of claim 9 wherein the data segment has one ID field.

17. The apparatus of claim 9 wherein the data segment has two ID fields.

18. The apparatus of claim 9 wherein the data segment has two ID fields, and the read/write head is a magnetoresistive head.

19. The apparatus of claim 10 wherein the data segment has a headerless format.

20. A disc drive system for storing information, comprising:

at least one disc having a plurality of concentric tracks on a surface of the disc, where each of the tracks includes at least one data segment adapted to store data and servo position information indicating a track centerline for each of the data segments;

a read/write head coupled within the disc drive, where the read/write head writes the data to and reads the data from the concentric track on the surface of the disc;

a memory containing an average value of a position error signal ($V_{PES}$) for at least one of the concentric tracks on the surface of the disc;

a write-off track threshold; and controller circuitry coupled to the read/write head comparing a read back position error signal ($V_{PES}$) with the average value of the position error signal ($V_{PES}$) and the write-off track threshold prior to performing a write operation.

21. The apparatus of claim 20 wherein the memory is the surface of the disc in the disc drive device.

22. The apparatus of claim 20 wherein the memory is a random access memory.

23. The apparatus of claim 21 wherein the data segment has two ID fields, and the read/write head is a magnetoresistive head.

24. The apparatus of claim 21 wherein the memory is the surface of the disc in the disc drive device.

* * * * *

UNITED STATES PATENT AND TRADEMARK OFFICE
CERTIFICATE OF CORRECTION

PATENT NO. : 5,825,578  PAGE 1 OF 5
DATED : October 20, 1998
INVENTOR(S) : Louis J. Shrinkle et al.

It is certified that error appears in the above-indentified patent and that said Letters Patent is hereby corrected as shown below:

ON THE TITLE PAGE,

Under [56] References Cited
U.S. PATENT DOCUMENTS

Insert --

| | | |
|---|---|---|
| 3,863,124 | 1/28/75 | Pierce et al...318/638 |
| 3,914,541 | 10/21/75 | Elliott........178/6.6R |
| 4,135,217 | 1/16/79 | Jacques et al..360/77 |
| 4,149,199 | 4/10/79 | Chick et al....360/77 |
| 4,314,295 | 2/2/82 | Frandsen.......360/106 |
| 4,371,960 | 2/1/83 | Kroiss.........369/43 |
| 4,396,961 | 8/2/83 | Prasad et al...360/78 |
| 4,485,418 | 11/27/84 | Bremmer........360/77 |
| 4,513,333 | 4/23/85 | Young et al....360/77 |
| 4,524,397 | 6/18/85 | Chalmers et al.360/77 |
| 4,562,494 | 12/31/85 | Bond...........360/75 |
| 4,605,977 | 8/12/86 | Matthews.......360/103 |
| 4,620,244 | 10/28/86 | Krause.........360/77 |
| 4,697,213 | 9/29/87 | Kitamura.......360/78 |
| 4,706,250 | 11/10/87 | Patel..........371/39 |
| 4,803,572 | 2/7/89 | Haruna et al...360/60 |
| 4,816,938 | 3/28/89 | Cowen et al....360/75 |
| 4,897,840 | 1/30/90 | Weiss et al....371/40.1 |
| 4,947,272 | 8/7/90 | Yokozawa.......360/77.15 |
| 4,965,782 | 10/23/90 | Mathews........369/48.00 |
| 5,055,731 | 10/8/91 | Nihei et al....310/309 |
| 5,146,372 | 9/8/92 | Cronch et al...360/51 |
| 5,161,077 | 11/3/92 | Jabbari........360/106 |

UNITED STATES PATENT AND TRADEMARK OFFICE
CERTIFICATE OF CORRECTION

PATENT NO. : 5,825,578
DATED : October 20, 1998
INVENTOR(S) : Louis J. Shrinkle et al.

It is certified that error appears in the above-indentified patent and that said Letters Patent is hereby corrected as shown below:

```
5,185,681   2/9/93     Volz et al.....360/77.05
5,189,578   2/23/93    Mori et al.....360/106
5,216,559   6/1/93     Springer.......360/106
5,233,487   8/3/93     Christensen et al..360/77.04
5,257,149   10/26/93   Meyer..........360/78.14
5,287,225   2/15/94    Sukigara.......360/31
5,303,105   4/12/94    Jorgenson......360/106
5,455,724   10/3/95    Suzuki et al...360/77.04
5,521,773   5/28/96    Suzuki et al...360/77.04
5,521,778   5/28/96    Boutaghou et al.360/106--
```

Under FOREIGN PATENT DOCUMENTS

```
Insert --
GB 2 060 217 A     4/27/81    United Kingdom
0 540 114 A1       5/5/93     EPO
0 549 814 A1       7/93       EPO
DE 3900-683-A      1/12/89    Germany
  (Abstract only)
1,173,268          3/12/91    England
Abstract of        5/2/91     PCT
  WO 91/06096
WO 91/06096        5/2/91     PCT--
```

UNITED STATES PATENT AND TRADEMARK OFFICE
CERTIFICATE OF CORRECTION

PATENT NO. : 5,825,578        PAGE 3 OF 5
DATED      : October 20, 1998
INVENTOR(S): Louis J. Shrinkle et al.

It is certified that error appears in the above-indentified patent and that said Letters Patent is hereby corrected as shown below:

Under OTHER PUBLICATIONS

Insert --Recording Properties of Multilayered Thin Film Media, by D.C. Palmer, K.E. Johnson, E.Y. Wu, and J.V. Peske, IEEE Transactions On Magnetics, Vol. 27, No. 6, November 1991, pp. 5307-5309.

Evolution of The Soft Error Rate Model, by P. Hardy and D.J. Malone, IEEE Transactions On Magnetics, Vol. 27, No. 6, November 1991, pp. 5313-5315.

Error Rate Performance of Experimental Gigabit Per Square Inch Recording Components, by T.D. Howell, D.P. McCown, T.A. Diola, Y. Tang, K.R. Hense, and R.L. Gee, IEEE Transactions On Magnetics, Vol. 26, No. 5, September 1990, pp. 2298-2302.

UNITED STATES PATENT AND TRADEMARK OFFICE
CERTIFICATE OF CORRECTION

PATENT NO. : 5,825,578          PAGE 4 OF 5
DATED : October 20, 1998
INVENTOR(S) : Louis J. Shrinkle et al.

It is certified that error appears in the above-indentified patent and that said Letters Patent is hereby corrected as shown below:

A Track Density Model for Magnetoresistive Heads Considering Erase Bands, by J.K. Lee and P.I. Bonyhard, IEEE Transactions On Magnetics, Vol. 26, No. 5, September 1990, pp. 2475-2477.

Demonstration Of 500 Megabits Per Square Inch With Digital Magnetic Recording, by Roy A. Jensen, Joost Mortelmans, and Robin Hauswitzer, IEEE Transactions On Magnetics, Vol. 26, No. 5, September 1990, pp. 2169 - 2171.

IBM's Next Generation Magnetoresistive Heads, 1987.

Magnetoresistive Read Magnetic Recording Head Offtrack Performance Assessment, by P.I. Bonyhard and J.K. Lee, IEEE Transactions On Magnetics, Vol. 26, November 1990, pp. 2448 - 2450.

UNITED STATES PATENT AND TRADEMARK OFFICE
CERTIFICATE OF CORRECTION

PATENT NO. : 5,825,578
DATED : October 20, 1998
INVENTOR(S) : Louis J. Shrinkle et al.

It is certified that error appears in the above-indentified patent and that said Letters Patent is hereby corrected as shown below:

<u>Design Issues For Practical Rigid Disk Magnetoresistive Heads</u>, by P.I. Bonyhard. IEEE, Transactions On Magnetics, Vol. 26, No. 6, November 1990, pp. 3001 - 3003.

<u>TMR and Squeeze at Gigabit Areal Densities</u>, by Patrick C. Arnett and Don McCown, IEEE Transactions On Magnetics, Vol. 28, No. 4, July 1992, pp. 1984 - 1986.

<u>Window-Shifting Mechanism In Data Separator</u>, IBM Technical Disclosure Bulletin, Vol. 30, No. 6, November 1987.--

Signed and Sealed this

Eleventh Day of May, 1999

*Attest:*

Q. TODD DICKINSON

*Attesting Officer*     Acting Commissioner of Patents and Trademarks